United States Patent
Liu et al.

(10) Patent No.: US 11,778,633 B2
(45) Date of Patent: *Oct. 3, 2023

(54) TRANSMISSION METHOD, NETWORK DEVICE, AND TERMINAL

(71) Applicant: HUAWEI TECHNOLOGIES CO., LTD., Guangdong (CN)

(72) Inventors: Jianqin Liu, Beijing (CN); Di Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

This patent is subject to a terminal disclaimer.

(21) Appl. No.: 17/520,416

(22) Filed: Nov. 5, 2021

(65) Prior Publication Data

US 2022/0061038 A1     Feb. 24, 2022

Related U.S. Application Data

(63) Continuation of application No. 16/441,938, filed on Jun. 14, 2019, now Pat. No. 11,184,887, which is a
(Continued)

(30) Foreign Application Priority Data

Jun. 16, 2017   (CN) .......................... 201710459498.1

(51) Int. Cl.
*H04W 72/04*   (2023.01)
*H04B 7/06*    (2006.01)
(Continued)

(52) U.S. Cl.
CPC ............ *H04W 72/23* (2023.01); *H04B 7/063* (2013.01); *H04B 7/0617* (2013.01);
(Continued)

(58) Field of Classification Search
CPC ... H04W 72/23; H04W 24/10; H04W 56/001; H04W 72/046; H04B 7/0617;
(Continued)

(56) References Cited

U.S. PATENT DOCUMENTS

| 10,004,030 B2 | 6/2018 | Liu et al. |
| 2013/0114554 A1 | 5/2013 | Yang et al. |

(Continued)

FOREIGN PATENT DOCUMENTS

| CN | 103004116 | 3/2013 |
| CN | 103220076 | 7/2013 |

(Continued)

OTHER PUBLICATIONS

Office Action in Chinese Appln. No. 201710459498.1, dated Mar. 14, 2023, 9 pages.
(Continued)

*Primary Examiner* — Walli Z Butt
*Assistant Examiner* — Thad N Defauw
(74) *Attorney, Agent, or Firm* — Fish & Richardson P.C.

(57) ABSTRACT

Example transmission methods and apparatus are described. One example method includes: determining, by a network device, downlink control information (DCI), wherein the DCI includes a first request field. The first request field indicates sending reference signal from the network device to a terminal device, and the first request field triggers the terminal device to report a measurement result of the reference signal to the network device. The measurement result
(Continued)

includes channel state information (CSI) and/or beam state information (BSI). The DCI is sent by the network device to the terminal.

40 Claims, 3 Drawing Sheets

Related U.S. Application Data continuation of application No. PCT/CN2018/091508, filed on Jun. 15, 2018.

(51) Int. Cl.
*H04L 5/00* (2006.01)
*H04W 24/10* (2009.01)
*H04W 56/00* (2009.01)
*H04W 72/23* (2023.01)
*H04W 72/044* (2023.01)

(52) U.S. Cl.
CPC ......... *H04B 7/0626* (2013.01); *H04B 7/0639* (2013.01); *H04L 5/0051* (2013.01); *H04W 24/10* (2013.01); *H04W 56/001* (2013.01); *H04W 72/046* (2013.01)

(58) Field of Classification Search
CPC .... H04B 7/0626; H04B 7/063; H04B 7/0639; H04B 7/0619; H04L 5/0051; H04L 5/0053; H04L 5/0094; H04L 5/0048; H04L 1/0027
See application file for complete search history.

(56) References Cited

U.S. PATENT DOCUMENTS

| | | | |
|---|---|---|---|
| 2013/0242778 | A1 | 9/2013 | Geirhofer et al. |
| 2015/0244443 | A1 | 8/2015 | Papasakellariou et al. |
| 2016/0165545 | A1 | 6/2016 | Ouchi et al. |
| 2016/0227519 | A1 | 8/2016 | Nimbalker et al. |
| 2016/0381587 | A1 | 12/2016 | Alexey et al. |
| 2017/0026938 | A1 | 1/2017 | Onggosanusi et al. |
| 2018/0014257 | A1 | 1/2018 | Ouchi et al. |
| 2018/0124624 | A1 | 5/2018 | Chen et al. |
| 2018/0220433 | A1 | 8/2018 | Li et al. |
| 2019/0058513 | A1* | 2/2019 | Mizusawa ............ H04W 24/10 |
| 2019/0173622 | A1* | 6/2019 | Xiong ................. H04W 72/046 |
| 2020/0014454 | A1* | 1/2020 | Guo .................... H04B 7/0408 |
| 2021/0126677 | A1* | 4/2021 | Park .................... H04W 72/04 |

FOREIGN PATENT DOCUMENTS

| | | |
|---|---|---|
| CN | 103314631 A | 9/2013 |
| CN | 104244319 | 12/2014 |
| CN | 106301692 | 1/2017 |
| CN | 106375044 | 2/2017 |
| CN | 106559109 | 4/2017 |
| CN | 106792786 | 5/2017 |
| JP | 2013236288 | 11/2013 |
| JP | 2014183486 | 9/2014 |
| JP | 2017050758 | 3/2017 |
| JP | 2018518102 | 7/2018 |
| WO | 2014109557 | 7/2014 |
| WO | 2016187744 | 12/2016 |
| WO | 2017014572 | 1/2017 |
| WO | 2017038368 | 3/2017 |
| WO | 2017086011 | 5/2017 |

OTHER PUBLICATIONS

3GPP TR 38.912 v0.0.2 (Mar. 2017), "3rd Generation Partnership Project; Technical Specification Group Radio Access work; Study on New Radio (NR) Access Technology, (Release 14)," Mar. 2017, 67 pages.

3GPP TS 38.212 V0.0.0 (May 2017), "3rd Generation Partnership Project; Technical Specification Group Radio Access Network;NR; Multiplexing and channel coding(Release 15)," May 2017, 10 pages.

3GPP TS 38.331 V0.0.3 (May 2017), "3rd Generation Partnership Project; Technical Specification Group Radio Access Network;NR; Radio Resource Control (RRC);Protocol specification(Release 15)," May 2017, 20 pages.

CATT, "CSI feedback for beamformed CSI-RS on PUSCH," 3GPP TSG RAN WG1 Meeting #82, R1-153946, Beijing, China, Aug. 24-28, 2015, 3 pages.

EPO Communication pursuant to Article 94(3) EPC issued in European Application No. 18817412.2 dated Mar. 16, 2021, 11 pages.

Extended European Search Report issued in European Application No. 18817412.2 dated Jan. 29, 2020, 10 pages.

Huawei et al., "Independent and joint control of CSI-RS transmission and CSI reporting for NR MIMO," 3GPP TSG Ran WG1 # 88 Meeting, R1-1701681, Athens, Greece, Feb. 13-17, 2017, 7 pages.

Huawei et al., "WF on Framework of Beam Management," 3GPP TSG RAN WG1 Meeting #88, R1-17xxxx, Athens, Greece, Feb. 13-17, 2017, 4 pages.

Huawei, HiSilicon, "Independent and joint control of CSI-RS transmission and CSI reporting for NR MIMO," 3GPP TSG RAN WG1 # 88 Meeting, R1-1701681; Athens, Greece, Feb. 13-17, 2017, 7 pages.

Lenovo et al., "Discussion of RS for DL beam management," 3GPP TSG RAN WG1 NR Ad-Hoc#2, R1-1710595, Qingdao, P.R. China, Jun. 27-30, 2017, 3 pages.

Office Action issued in Chinese Application No. 201880039860.2 dated May 28, 2020, 361 pages (with English translation).

Office Action issued in Indian Application No. 201937024161 dated Jan. 21, 2021, 7 pages.

Office Action issued in Japanese Application No. 2019-540581 dated Apr. 12, 2021, 14 pages (with English translation).

Office Action issued in Japanese Application No. 2019-540581 dated Sep. 7, 2020, 16 pages (with English translation).

PCT International Search Report and Written Opinion issued in International Application No. PCT/CN2018/091508 dated Sep. 25, 2018, 13 pages.

Qualcomm Incorporated, "Remaining details on aperiodic CSI-RS," 3GPP TSG-RAN WG1 #86bis, R1-1609972, Lisbon, Portugal, Oct. 10-14, 2016, 4 pages.

R1-1708613—Qualcomm Incorporated, "View on DCI contents," 3GPP TSG-RAN WG1#89, Hangzhou, P.R. China, May 15-19, 2017, 2 pages.

R1-1708907—Nokia et al., "On beam grouping and reporting," 3GPP TSG-RAN WG1 Meeting #89, Hangzhou, P.R. China, May 15-19, 2017, 13 pages.

Texas Instruments, "CQI reference resource with CSI-RS," 3GPP TSG HAN WG1 #63bis, R1-110260, Dublin, Ireland, Jan. 17-21, 2011, 6 pages.

3GPP TS 38.321 V0.0.3, "3rd Generation Partnership Project; Technical Specification Group Radio Access Network; NR; Medium Access Control (MAC) protocol specification (Release 15)," May 2017, 20 pages.

* cited by examiner

TRANSMISSION METHOD, NETWORK DEVICE, AND TERMINAL

CROSS-REFERENCE TO RELATED APPLICATIONS

This application is a continuation of U.S. patent application Ser. No. 16/441,938, filed on Jun. 14, 2019, which is a continuation of International Application No. PCT/CN2018/091508, filed on Jun. 15, 2018, which claims priority to Chinese Patent Application No. 201710459498.1, filed on Jun. 16, 2017. All of the afore-mentioned patent applications are hereby incorporated by reference in their entireties.

TECHNICAL FIELD

This application relates to the communications field, and more specifically, to a transmission method, a network device, and a terminal.

BACKGROUND

In an existing system, a terminal performs channel estimation by using a reference signal sent by a network device, and after obtaining state information of a downlink channel, the terminal feeds back the channel state information (CSI) to the network device. For example, the terminal may feed back a precoding matrix index (PMI), a rank index (RI), and a channel quality index (CQI) to the network device, and the network device sends data based on the information.

In addition, the network device may perform beam management by using a reference signal. The network device repeatedly sends the reference signal in different time units, and the terminal performs receive beam training in different time units by using different receive beams (beam). In this case, the terminal does not need to report a measurement result of the reference signal.

In an existing Long Term Evolution (LTE) standard, sending of aperiodic reference signals and reporting of aperiodic measurement results are jointly triggered. In such a mechanism in which reporting is jointly triggered, resources required for reporting the measurement result are allocated while the measurement result is triggered. However, if the measurement result does not need to be reported, a resource waste is caused by the prior-art method.

SUMMARY

This application provides a transmission method, a network device, and a terminal, to save resources.

According to a first aspect, a transmission method is provided. The method includes: determining, by a network device, downlink control information (DCI), wherein the DCI includes a first request field, information in the first request field is only used to instruct to send a first reference signal on a first resource, or the information in the first request field is used to instruct to send the first reference signal on the first resource and instruct a terminal to report a measurement result of the first reference signal on the first resource, and the measurement result includes channel state information CSI and/or beam state information (BSI); and sending, by the network device, the DCI to the terminal.

Herein, the beam state information BSI may include information such as reference signal received power (RSRP), a beam index, or an identity (ID).

Optionally, in this application, the first reference signal may be a secondary synchronization signal (SSS), a primary synchronization signal (PSS), a channel state information reference signal (CSI-RS), or a demodulation reference signal (DMRS).

The PSS and/or the SSS may be sent in a form of an SS block. That is, the PSS, the SSS, and a physical broadcast channel (PBCH) are sent at different time in an SS block, or the PSS and/or the SSS may not be sent in an SS block, that is, the PSS and/or the SSS may be separately sent.

Optionally, in this application, the first request field may be a CSI request field (value of CSI request field) in an existing DCI format. In the existing DCI format, the DCI format can be less modified and better compatible with the prior art.

According to the transmission method in this application, when the terminal does not need to report a measurement result of a reference signal (for example, the first reference signal), the network device instructs the terminal not to report the measurement result. Because the terminal does not need to report the measurement result, the network device does not allocate a resource to the terminal for reporting the measurement result, so that the resource can be saved.

In a possible implementation, a format of the DCI is a first format, and the DCI satisfying the first format is used for downlink data transmission; and the information in the first request field is only used to instruct to send the first reference signal.

In a possible implementation, the format of the DCI is a second format, and the DCI satisfying the second format is used for uplink data transmission; and the information in the first request field instructs to send the first reference signal and instructs the terminal to report the measurement result of the first reference signal.

In a possible implementation, the first format may alternatively be a newly-defined DCI format (for example, denoted as a third format). The third format is different from the existing DCI format, and the DCI satisfying the third format may include only the first request field and a scheduling information field, or may include only the first request field. Information in the scheduling information field is used to indicate downlink data scheduling information of the terminal. The terminal can determine, based on the information in the scheduling information field, a resource that is occupied by downlink data sent by the network device.

In this embodiment, the first request field in the DCI may trigger reporting of the CSI, or the first request field in the DCI may trigger reporting of the BSI, or the first request field in the DCI triggers reporting of both the CSI and the BSI. Specific state information that needs to be reported by the terminal may be configured by using higher layer signaling. In other words, the network device may configure, by using the higher layer signaling, the specific state information to be reported by the terminal. When determining, according to an instruction of the first request field in the DCI, that the measurement result needs to be reported, the terminal reports the measurement result according to an instruction of the higher layer signaling.

Optionally, the higher layer signaling in this application may be radio resource control (RRC) signaling or Media Access Control control element (MAC CE) signaling.

According to the transmission method in this embodiment of this application, depending on whether the terminal needs to report the measurement result, the network device may trigger, by selecting different DCIs, the terminal to perform a corresponding operation. Compared with a prior-art solution in which the terminal can be instructed only by a UL grant-related DCI, the method improves flexibility of the DCI.

In a possible implementation, the first resource is a first reference signal resource set in S first reference signal resource sets; or the first resource is a first reference signal resource or a group of first reference signal resources in the first reference signal resource set, wherein the first reference signal resource set includes N groups of first reference signal resources, a group of first reference signal resources includes at least one first reference signal resource, and both S and N are integers greater than or equal to 1.

In a possible implementation, the first request field occupies $\lceil \log_2(T) \rceil$ bits, a value of T is any one of S, S+1, SN, and SN+1, and $\lceil \ \rceil$ represents rounding up.

Optionally, the S first reference signal resource sets may be configured by the network device for the terminal by using at least one of higher layer signaling, layer 2 signaling, and layer 1 signaling. A layer 2 herein means a MAC layer, and a layer 1 is a physical layer.

Optionally, in this application, the first resource triggered by the DCI, for example, the $1^{st}$ reference signal resource in the $1^{st}$ first reference signal resource set, or the first reference signal resource set, may be information such as a location of the first reference signal, a quantity of ports for sending the first reference signal, and port numbers of the ports for sending the first reference signal.

In a possible implementation, the method may further include: sending, by the network device, power information to the terminal, wherein the power information is used by the terminal to determine transmit power of the first reference signal.

Further, the network device may send the power information by using a broadcast channel, system information, or higher layer signaling.

The terminal may determine the transmit power of the first reference signal based on the power information, so that the terminal may control uplink power based on the transmit power of the first reference signal, thereby improving accuracy of a channel measurement result.

In a possible implementation, the power information is used to indicate a power ratio of the first reference signal to a second reference signal.

Optionally, the second reference signal may be an SSS.

In a possible implementation, the sending of the first reference signal and the reporting of the measurement result satisfy the following condition:

$Y=X+Z,$ wherein X represents a delay between triggering of the sending of the first reference signal and completion of the sending of the first reference signal, Y represents a delay between triggering of the reporting of the measurement result and completion of the reporting of the measurement result, Z is a predefined value, X, Y, and Z each are greater than or equal to 0, and X is configurable. Optionally, X may alternatively be a predefined value, and Z is configurable.

The network device may determine, based on the foregoing formula, whether a measurement report currently sent by the terminal is a measurement report for a first reference signal that is last sent by the network device. In this way, the network device may send data by using a latest measurement result, thereby improving transmission performance.

According to a second aspect, a transmission method is provided. The method includes: receiving, by a terminal, downlink control information DCI sent by a network device, wherein the DCI includes a first request field, information in the first request field is only used to instruct to send a first reference signal on a first resource, or the information in the first request field is used to instruct to send the first reference signal on the first resource and instruct the terminal to report a measurement result of the first reference signal on the first resource, and the measurement result includes channel state information CSI and/or beam state information BSI; and determining, by the terminal based on the DCI, whether to report the measurement result.

Optionally, in this application, the first reference signal may be an SSS, a PSS, a CSI-RS, or a demodulation reference signal.

The PSS and/or the SSS may be sent in a form of an SS block. That is, the PSS, the SSS, and a physical broadcast channel PBCH are sent at different time in an SS block, or the PSS and/or the SSS may not be sent in an SS block, that is, the PSS and/or the SSS may be separately sent.

Optionally, in this application, the first request field may be a CSI request field (value of CSI request field) in an existing DCI format. In the existing DCI format, the DCI format can be less modified and better compatible with the prior art.

According to the transmission method in this application, when the terminal does not need to report a measurement result of a reference signal (for example, the first reference signal), the network device instructs the terminal not to report the measurement result. Because the terminal does not need to report the measurement result, the network device does not allocate a resource to the terminal for reporting the measurement result, so that the resource can be saved.

In a possible implementation, a format of the DCI is a first format, and the DCI satisfying the first format is used for downlink data transmission; and the information in the first request field is only used to instruct to send the first reference signal.

In a possible implementation, the format of the DCI is a second format, and the DCI satisfying the second format is used for uplink data transmission; and the information in the first request field instructs to send the first reference signal and instructs the terminal to report the measurement result of the first reference signal.

According to the transmission method in this embodiment of this application, depending on whether the terminal needs to report channel quality information, the network device may trigger, by selecting different DCIs, the terminal to perform a corresponding operation. Compared with a prior-art solution in which the terminal can be instructed only by a UL grant-related DCI, the method improves flexibility of the DCI.

In a possible implementation, the first resource is a first reference signal resource set in S first reference signal resource sets; or the first resource is a first reference signal resource or a group of first reference signal resources in the first reference signal resource set, wherein the first reference signal resource set includes N groups of first reference signal resources, a group of first reference signal resources includes at least one first reference signal resource, and both S and N are integers greater than or equal to 1.

In a possible implementation, the first request field occupies $\lceil \log_2(T) \rceil$ bits, a value of T is any one of S, S+1, SN, and SN+1, and $\lceil \ \rceil$ represents rounding up.

Optionally, the S first reference signal resource sets may be configured by the network device for the terminal by using at least one of higher layer signaling, layer 2 signaling, and layer 1 signaling. A layer 2 herein means a MAC layer, and a layer 1 is a physical layer.

Optionally, in this application, the first resource triggered by the DCI, for example, the $1^{st}$ first reference signal resource set, the $1^{st}$ first reference signal resource in the first reference signal resource set, or the $1^{st}$ group of first reference signal resources in the first reference signal resource set, may be information such as a time-frequency resource location of the first reference signal, a quantity of ports for sending the first reference signal, and port numbers of the ports for sending the first reference signal.

In a possible implementation, the method may further include: receiving, by the terminal, power information sent by the network device; and determining, by the terminal, transmit power of the first reference signal based on the power information.

Further, the terminal may receive, by using a broadcast channel, system information, or higher layer signaling, the power information sent by the network device.

The terminal may determine the transmit power of the first reference signal based on the power information, so that the terminal may control uplink power based on the transmit power of the first reference signal, thereby improving accuracy of a channel measurement result.

Optionally, the power information is used to indicate a power ratio of the first reference signal to a second reference signal.

Optionally, the second reference signal may be an SSS.

In a possible implementation, the sending of the first reference signal and the reporting of the measurement result satisfy the following condition:

$$Y=X+Z,$$

wherein X represents a delay between triggering of the sending of the first reference signal and completion of the sending of the first reference signal, Y represents a delay between triggering of the reporting of the measurement result and completion of the reporting of the measurement result, Z is a predefined value, X, Y, and Z each are greater than or equal to 0, and X is configurable. Optionally, X may alternatively be a predefined value, and Z is configurable.

The network device may determine, based on the foregoing formula, whether a measurement report currently sent by the terminal is a measurement report for a first reference signal that is last sent by the network device. In this way, the network device may send data by using a latest measurement result, thereby improving transmission performance.

According to a third aspect, a network device is provided. The network device is configured to perform the method according to the first aspect or any possible implementation of the first aspect. Specifically, the network device includes units configured to perform the method according to the first aspect or any possible implementation of the first aspect.

According to a fourth aspect, a terminal is provided. The terminal is configured to perform the method according to the second aspect or any possible implementation of the second aspect. Specifically, the terminal includes units configured to perform the method according to the second aspect or any possible implementation of the second aspect.

According to a fifth aspect, a network device is provided. The network device includes a transceiver, a memory, and a processor. The memory is configured to store a computer program, and the processor is configured to invoke the computer program from the memory and execute the computer program, so that a system performs the method according to the first aspect or any possible implementation of the first aspect.

According to a sixth aspect, a terminal is provided. The terminal includes a transceiver, a memory, and a processor. The memory is configured to store a computer program, and the processor is configured to invoke the computer program from the memory and execute the computer program, so that a system performs the method according to the second aspect or any possible implementation of the second aspect.

According to a seventh aspect, a computer readable storage medium is provided. The computer readable storage medium is configured to store a computer program, wherein the computer program includes instructions used to perform the method according to the foregoing aspects or any possible implementation of the foregoing aspects.

According to an eighth aspect, a computer program product including an instruction is provided. When the computer program product runs on a computer, the computer is enabled to perform the method according to the foregoing aspects or any possible implementation of the foregoing aspects.

DESCRIPTION OF EMBODIMENTS

The following describes technical solutions of this application with reference to the accompanying drawings.

Figure 1:
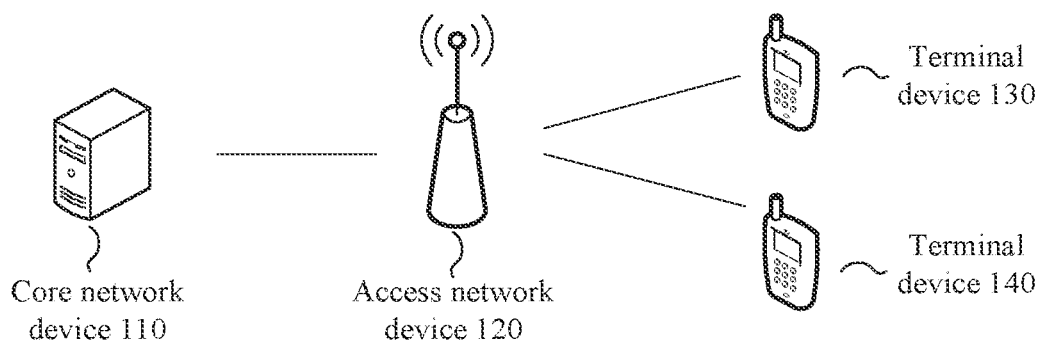
FIG. 1 is a schematic diagram of a system architecture applied to this application.

FIG. 1 is a schematic diagram of an architecture of a mobile communications system applied to embodiments of this application. As shown in FIG. 1, the mobile communications system includes a core network device 110, an access network device 120, and at least one terminal device (a terminal device 130 and a terminal device 140 shown in FIG. 1). The terminal device is connected to the access network device 120 in a wireless manner, and the access network device 120 is connected to the core network device 110 in a wired or wireless manner. The core network device 110 and the access network device 120 may be different independent physical devices, or functions of the core network device 110 and logical functions of the access network device 120 may be integrated into one physical device, or one physical device integrates some functions of the core network device 110 and some functions of the access network device 120. The terminal device may be disposed at fixed positions, or may be movable. FIG. 1 is only a schematic diagram, and the communications system may further include other network devices, for example, a wireless relay device and a wireless backhaul device (not shown in FIG. 1). In the embodiments of this application, quantities of core network devices, access network devices, and terminal devices included in the mobile communications system are not limited.

The access network device 120 is an access device used by the terminal device to access the mobile communications system in a wireless manner. The access network device 120 may be a nodeB (NB), an evolved nodeB (eNB), a base station in a 5G mobile communications system, a base station in a new radio (NR) communications system, a base station in a future mobile communications system, an access node in a Wi-Fi system, or the like. A specific technology and a specific device form used by a wireless access network device are not limited in the embodiments of this application. Unless otherwise stated, in this application, expressions of a 5G system and an NR system are interchangeable.

The terminal device may also be referred to as a terminal, user equipment (UE), a mobile station (MS), a mobile terminal (MT), or the like. The terminal device may be a mobile phone, a tablet computer (Pad), a computer having wireless sending and receiving functions, a virtual reality (VR) terminal device, an augmented reality (AR) terminal device, a wireless terminal in industrial control, a wireless terminal in self-driving, a wireless terminal in remote medical surgery (remote medical surgery), a wireless terminal in a smart grid, a wireless terminal in transportation safety, a wireless terminal in a smart city, a wireless terminal in a smart home, or the like.

The access network device and the terminal device may be deployed terrestrially, including indoors or outdoors, or may be handheld or vehicle-mounted; or may be deployed on a water surface; or may be deployed on a plane, a balloon, or a man-made satellite in the sky. Application scenarios of the access network device and the terminal device are not limited in the embodiments of this application.

The access network device may communicate with the terminal device and one terminal device may communicate with another terminal device by using either a licensed spectrum or an unlicensed spectrum, or by using both a licensed spectrum and an unlicensed spectrum. The access network device may communicate with the terminal device and one terminal device may communicate with another terminal device by using either a spectrum below 6 gigahertz (GHz) or a spectrum above 6 GHz, or by using both a spectrum below 6 GHz and a spectrum above 6 GHz. Spectrum resources used between the access network device and the terminal device are not limited in the embodiments of this application.

It should be understood that a network device in the following description may be the access network device in the foregoing description, or may be another network device that communicates with the terminal in a wireless manner. This is not limited in this application.

In an existing system, a terminal performs channel estimation by using a reference signal sent by a network device, and after obtaining state information of a downlink channel, the terminal feeds back CSI to the network device. For example, the terminal may feed back a PMI, an RI, and a CQI to the network device, and the network device sends data based on the information.

In addition, the network device may perform beam management by using a reference signal. The network device repeatedly sends the reference signal in different time units, and the terminal performs receive beam training in different time units by using different receive beams. In this case, the terminal does not need to report a measurement result of the reference signal.

In an LTE standard, sending of aperiodic reference signals and reporting of aperiodic measurement results are jointly triggered. In such a mechanism in which reporting is jointly triggered, resources required for reporting the measurement result are allocated while the measurement result is triggered. However, if the measurement result does not need to be reported, a resource waste is caused by the prior-art method.

In view of this, this application provides a transmission method. According to the transmission method in this application, when the terminal does not need to report a measurement result (for example, beam state information BSI) that is obtained by measuring a reference signal, the network device instructs the terminal not to report the measurement result. Because the terminal does not need to report the measurement result, the network device does not allocate a resource to the terminal for reporting the measurement result, so that the resource can be saved.

The embodiments of the present invention are described in detail below with reference to the accompanying drawings. It should be understood that "first" and "second" in the embodiments of this application are merely used for distinguishing purposes, and are not intended to constitute any limitation on the present invention. For example, a first reference signal and a second reference signal are merely used for distinguishing between different types of reference signals.

Figure 2:
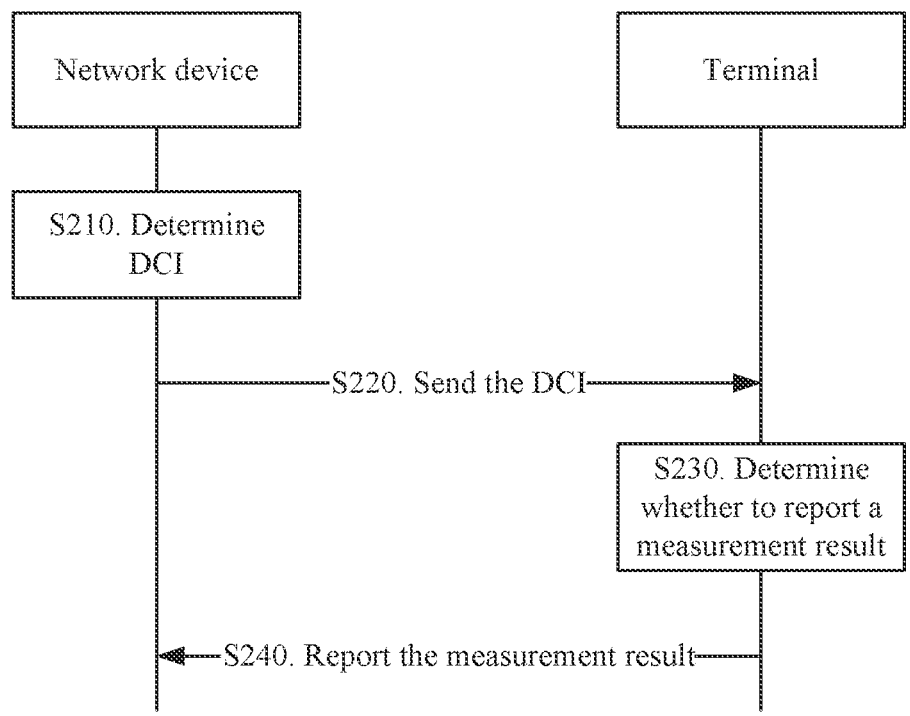
FIG. 2 is a schematic flowchart of a transmission method according to this application.

FIG. 2 is a schematic flowchart of a transmission method according to an embodiment of the present invention from a perspective of device interaction. A network device in FIG. 2 may be the wireless access network device 120 in FIG. 1, and a terminal device in FIG. 2 may be the terminal device 130 or the terminal device 140 in FIG. 1.

S210. The network device determines downlink control information DCI.

The DCI includes a first request field, and information in the first request field is only used to instruct to send a first reference signal on a first resource, or the information in the first request field may instruct to send the first reference signal on the first resource and instruct the terminal to report a measurement result of the first reference signal on the first resource.

Specifically, the network device determines whether to trigger the sending of the first reference signal, that is, whether to send the first reference signal to the terminal. If determining to send the first reference signal to the terminal, the network device determines a resource (for example, denoted as the first resource) used for sending the first reference signal, and determines whether the terminal needs to report the measurement result of the first reference signal (referred to as the measurement result below) corresponding to the first resource. The network device determines the DCI based on the foregoing determining result, and indicates, to the terminal based on the information in the first request field in the DCI, the first resource and an operation that needs to be performed by the terminal. That is, the first request field only instructs to send the first reference signal on the first resource (that is, Case 1), or the first request field instructs to send the first reference signal and instructs to send the measurement result (that is, Case 2).

The two cases are described in detail below.

Case 1

Specifically, the information in the first request field is only used to instruct to send the first reference signal on the first resource, but not to instruct the terminal to report the measurement result of the first reference signal on the first resource. That is, the information in the first request field is used to indicate to the terminal that the network device sends the first reference signal on the first resource, and the terminal does not need to report the measurement result of the first reference signal on the first resource. In other words, the first request field instructs to send the first reference signal on the first resource and instructs the terminal not to report the measurement result.

Therefore, according to the transmission method in this application, when the terminal does not need to report a measurement result of a reference signal (for example, the first reference signal), the network device instructs the terminal not to report the measurement result. Because the terminal does not need to report the measurement result, the network device does not allocate a resource to the terminal for reporting the measurement result, so that the resource can be saved.

Optionally, in this case, a format of the DCI may be a first format. The DCI satisfying the first format is used for downlink data transmission.

For example, when the network device performs beam management and the terminal performs receive beam training, the network device only needs to trigger an aperiodic first reference signal and does not require the terminal to report the measurement result. In this case, the network device may use the DCI in the first format, and based on instruction of the information in a first request field in the DCI in the first format, the network device sends the first reference signal and does not require the terminal to report the measurement result.

Further, the first format may be a DCI format 2.

In addition, the first format may alternatively be a newly-defined DCI format (for example, denoted as a third format). The third format is different from the existing DCI format, and the DCI satisfying the third format may include only the first request field and a scheduling information field, or may include only the first request field. Information in the scheduling information field is used to indicate downlink data scheduling information of the terminal. The terminal can determine, based on the information in the scheduling information field, a resource that is occupied by downlink data sent by the network device.

It should be understood that the first format is not limited to the DCI formats listed above, but the first format may alternatively be a DCI format defined in a 5G system or a future new system.

Case 2

Specifically, the information in the first request field not only indicates to the terminal that the network device sends the first reference signal on the first resource, but also indicates to the terminal that the terminal needs to report the measurement result of the first reference signal that is sent on the first resource. The measurement result includes channel state information CSI and/or beam state information BSI. In other words, the first request field in the DCI may trigger reporting of the CSI, or the first request field in the DCI may trigger reporting of the BSI, or the first request field in the DCI triggers reporting of both the CSI and the BSI. Specific state information that needs to be reported by the terminal may be configured by using higher layer signaling. In other words, the network device may configure, by using the higher layer signaling, the specific state information to be reported by the terminal. When determining, according to an instruction of the first request field in the DCI, that the measurement result needs to be reported, the terminal reports the measurement result.

Herein, the beam state information BSI may include information such as reference signal received power RSRP, a beam index, or an ID.

Optionally, in this case, a format of the DCI is a second format. The DCI satisfying the second format is used for uplink data transmission.

For example, when the network device performs beam management and the terminal side needs to perform measurement and report the measurement result, the network device may trigger, by using the DCI in the second format, both sending of an aperiodic first reference signal and reporting of a measurement result of the aperiodic first reference signal. The terminal reports the measurement result based on the DCI and an instruction of higher layer signaling.

Further, the second format may be a DCI format 0 or a DCI format 4, or a DCI format in any other form. This is not specifically limited herein.

It should be understood that the second format is not limited to the DCI formats listed above, but the second format may alternatively be a DCI format defined in a 5G system or a future new system.

Optionally, in this application, the first request field may be a CSI request field (value of CSI request field) in an existing DCI format. In the existing DCI format, the DCI format can be less modified and better compatible with the prior art. In addition, the first request field may alternatively be a newly-defined request field. This is not limited herein.

Optionally, in this application, the first reference signal may be a secondary synchronization signal (SSS), a primary synchronization signal (PSS), a channel state information reference signal (CSI-RS), or a demodulation reference signal (DMRS).

The PSS and/or the SSS may be sent in a form of an SS block. That is, the PSS, the SSS, and a physical broadcast channel PBCH are sent at different time in an SS block, or the PSS and/or the SSS may not be sent in an SS block, that is, the PSS and/or the SSS may be separately sent.

It should be understood that a type of the first reference signal is not specifically limited in this application, but the first reference signal may alternatively be another reference signal that may emerge in the future.

According to the transmission method in this application, when the terminal does not need to report a measurement result (for example, BSI and/or CSI) that is obtained by measuring a reference signal, the network device instructs the terminal not to report the measurement result. Because the terminal does not need to report the measurement result, the network device does not allocate a resource to the terminal for reporting the measurement result, so that the resource can be saved.

In addition, depending on whether the terminal needs to report the measurement result, the network device may trigger, by selecting different DCIs, the terminal to perform a corresponding operation. Compared with a prior-art solution in which the terminal can be instructed only by a UL grant-related DCI, the method improves flexibility of the DCI.

Optionally, in this embodiment of this application, the first resource may be a first reference signal resource set in S first reference signal resource sets. The first reference signal resource set includes N groups of first reference signal resources or at least one first reference signal resource, a group of first reference signal resources includes at least one first reference signal resource, and both S and N are integers greater than or equal to 1.

Specifically, for example, the S first reference signal resource sets may be configured by the network device for the terminal by using at least one of higher layer signaling, layer 2 signaling, and layer 1 signaling, and may be triggered by the DCI. In this application, the first resource triggered by the DCI may be a first reference signal resource set in the S first reference signal resource sets. That is, the first reference signal sent by the network device is a first reference signal corresponding to all first reference signal resources that are included in the first reference signal resource set. The resource triggered by the DCI, for example, may be information such as a time-frequency resource location of the first reference signal, a quantity of ports for sending the first reference signal, and port numbers of the ports for sending the first reference signal. The terminal may measure the first reference signal based on the resource information.

Further, the first request field may occupy $\lceil \log_2(T) \rceil$ bits, a value of T is any one of S, S+1, SN, or SN+1, and $\lceil \ \rceil$ represents rounding up.

Optionally, the higher layer signaling in this application may be RRC signaling, MAC CE signaling, or the like.

Table 1 shows an example of Case 1, and information in a first request field shown in Table 1 only instructs to send a first reference signal on a first reference signal resource set.

TABLE 1

| Value of a first Request Field (Information in a First Request Field) | Description |
|---|---|
| 000 | Not triggering sending of a first reference signal |
| 001 | Trigger sending of a first reference signal corresponding to the $1^{st}$ first reference signal resource set in S first reference signal resource sets |
| 010 | Trigger sending of a first reference signal corresponding to the $2^{nd}$ first reference signal resource set in S first reference signal resource sets |
| 011 | Trigger sending of a first reference signal corresponding to the $3^{rd}$ first reference signal resource set in S first reference signal resource sets |
| 100 | Trigger sending of a first reference signal corresponding to the $4^{th}$ first reference signal resource set in S first reference signal resource sets |
| 101 | Trigger sending of a first reference signal corresponding to the $5^{th}$ first reference signal resource set in S first reference signal resource sets |
| 110 | Trigger sending of a first reference signal corresponding to the $6^{th}$ first reference signal resource set in S first reference signal resource sets |
| 111 | Trigger sending of a first reference signal corresponding to the $7^{th}$ first reference signal resource set in S first reference signal resource sets |

Referring to Table 1, for example, in step S210, if the value of the first request field in the DCI determined by the network device is "000", it indicates that the sending of the first reference signal is not triggered; or if the value of the first request field in the DCI is "001", it indicates that the network device is to send the first reference signal on the $1^{st}$ first reference signal resource set in the S first reference signal resource sets and the terminal does not need to report the measurement result of the first reference signal sent on all resources that are included in the first reference signal resource.

Table 2 shows an example of Case 2, and the information in the first request field shown in Table 2 is used to instruct to send the first reference signal on the first reference signal resource in the first reference signal resource set and instruct to report the measurement result.

TABLE 2

| Value of a first Request Field (Information in a First Request Field) | Description |
|---|---|
| 000 | Not triggering sending of a first reference signal and reporting of CSI and/or BSI |
| 001 | Trigger sending of a first reference signal corresponding to the $1^{st}$ first reference signal resource set in S first reference signal resource sets and reporting of CSI and/or BSI |
| 010 | Trigger sending of a first reference signal corresponding to the $2^{nd}$ first reference signal resource set in S first reference signal resource sets and reporting of CSI and/or BSI |
| 011 | Trigger sending of a first reference signal corresponding to the $3^{rd}$ first reference signal resource set in S first reference signal resource sets and reporting of CSI and/or BSI |
| 100 | Trigger sending of a first reference signal corresponding to the $4^{th}$ first reference signal resource set in S first reference signal resource sets and reporting of CSI and/or BSI |
| 101 | Trigger sending of a first reference signal corresponding to the $5^{th}$ first reference signal resource set in S first reference signal resource sets and reporting of CSI and/or BSI |
| 110 | Trigger sending of a first reference signal corresponding to the $6^{th}$ first reference signal resource set in S first reference signal resource sets and reporting of CSI and/or BSI |
| 111 | Trigger sending of a first reference signal corresponding to the $7^{th}$ first reference signal resource set in S first reference signal resource sets and reporting of CSI and/or BSI |

Referring to Table 2, for example, in S210 step, if the value of the first request field in the DO determined by the network device is "000", it indicates that the network device does not trigger the sending of the first reference signal and the reporting of the measurement result. For another example, if the value of the first request field is "001", it indicates that the network device is to send the first reference signal on all resources that are included in the first reference signal resource set and the terminal needs to report the measurement result of the first reference signal sent on all the resources that are included in the first reference signal resource set.

Optionally, in this embodiment of this application, the first resource may be a first reference signal resource or a group of first reference signal resources in a first reference signal resource set in the S first reference signal resource sets. The first reference signal resource set includes at least one first reference signal resource or N groups of first reference signal resources, a group of first reference signal resources includes at least one first reference signal resource, and both S and N are integers greater than or equal to 1.

Specifically, for example, the S first reference signal resource sets may be configured by the network device for the terminal by using at least one of higher layer signaling, layer 2 signaling, and layer 1 signaling, and may be triggered by the DCI. In this application, the first resource triggered by the DCI may be a first reference signal resource in a first reference signal resource set in the S first reference signal resource sets, or a group of first reference signal resources in a first reference signal resource set in the S first reference signal resource sets, for example, the $1^{st}$ first reference signal resource in the $1^{st}$ first reference signal resource set or the $1^{st}$ group of first reference signal resources in the 1$^{st}$ first reference signal resource set. The resource triggered by the DCI, for example, may be information such as a time-frequency resource location of the first reference signal, a quantity of ports for sending the first reference signal, and port numbers of the ports for sending the first reference signal. The terminal may measure the first reference signal based on the resource information.

In this embodiment, optionally, the network device may indicate, by using the higher layer signaling, the first reference signal resource set in the S first reference signal resource sets triggered by the network device. For example, the network device may indicate, by using the higher layer signaling, the 1$^{st}$ first reference signal resource set in the S first reference signal resource sets triggered by the network device.

Further, the first request field occupies $\lceil \log_2(T) \rceil$ bits, a value of T is any one of S, S+1, SN, or S+1, and $\lceil \ \rceil$ represents rounding up.

Table 3 shows another example of Case 1, and the information in the first request field shown in Table 3 only instructs to send the first reference signal on resource(s) that are in the first reference signal resource set.

TABLE 3

| Value of a first Request Field (Information in a First Request Field) | Description |
| --- | --- |
| 000 | Not triggering sending of a first reference signal |
| 001 | Trigger sending of a first reference signal corresponding to the 1$^{st}$ first reference signal resource or the 1$^{st}$ group of first reference signal resources in a first reference signal resource set |
| 010 | Trigger sending of a first reference signal corresponding to the 2$^{nd}$ first reference signal resource or the 2$^{nd}$ group of first reference signal resources in a first reference signal resource set |
| 011 | Trigger sending of a first reference signal corresponding to the 3$^{rd}$ first reference signal resource or the 3$^{rd}$ group of first reference signal resources in a first reference signal resource set |
| 100 | Trigger sending of a first reference signal corresponding to the 4$^{th}$ first reference signal resource or the 4$^{th}$ group of first reference signal resources in a first reference signal resource set |
| 101 | Trigger sending of a first reference signal corresponding to the 5$^{th}$ first reference signal resource or the 5$^{th}$ group of first reference signal resources in a first reference signal resource set |
| 110 | Trigger sending of a first reference signal corresponding to the 6$^{th}$ first reference signal resource or the 6$^{th}$ group of first reference signal resources in a first reference signal resource set |
| 111 | Trigger sending of a first reference signal corresponding to the 7$^{th}$ first reference signal resource or the 7$^{th}$ group of first reference signal resources in a first reference signal resource set |

Referring to Table 3, for example, in step S210, if the value of the first request field in the DCI determined by the network device is "000", it indicates that the sending of the first reference signal is not triggered; or if the value of the first request field is "001", it indicates that the network device is to send the first reference signal on the 1$^{st}$ first reference signal resource or the 1$^{st}$ group of first reference signal resources in the 1$^1$ first reference signal resource set and the terminal does not need to report the measurement result of the first reference signal sent on the 1$^{st}$ first reference signal resource or the 1$^{st}$ group of first reference signal resources in the 1$^{st}$ first reference signal resource set.

Table 4 shows another example of Case 2, and the information in the first request field shown in Table 4 is used to instruct to send the first reference signal on resources that are in the first reference signal resource set and instruct to report the measurement result.

TABLE 4

| Value of a first Request Field (Information in a First Request Field) | Description |
| --- | --- |
| 000 | Not triggering sending of a first reference signal and reporting of CSI and/or BSI |
| 001 | Trigger sending of a first reference signal corresponding to the 1$^{st}$ first reference signal resource or the 1$^{st}$ group of first reference signal resources in a first reference signal resource set and reporting of CSI and/or BSI |
| 010 | Trigger sending of a first reference signal corresponding to the 2$^{nd}$ first reference signal resource or the 2$^{nd}$ group of first reference signal resources in a first reference signal resource set and reporting of CSI and/or BSI |
| 011 | Trigger sending of a first reference signal corresponding to the 3$^{rd}$ first reference signal resource or the 3$^{rd}$ group of first reference signal resources in a first reference signal resource set and reporting of CSI and/or BSI |
| 100 | Trigger sending of a first reference signal corresponding to the 4$^{th}$ first reference signal resource or the 4$^{th}$ group of first reference signal resources in a first reference signal resource set and reporting of CSI and/or BSI |
| 101 | Trigger sending of a first reference signal corresponding to the 5$^{th}$ first reference signal resource or the 5$^{th}$ group of first reference signal resources in a first reference signal resource set and reporting of CSI and/or BSI |
| 110 | Trigger sending of a first reference signal corresponding to the 6$^{th}$ first reference signal resource or the 6$^{th}$ group of first reference signal resources in a first reference signal resource set and reporting of CSI and/or BSI |
| 111 | Trigger sending of a first reference signal corresponding to the 7$^{th}$ first reference signal resource or the 7$^{th}$ group of first reference signal resources in a first reference signal resource set and reporting of CSI and/or BSI |

Referring to Table 4, for example, in step S210, if the value of the first request field in the DCI determined by the network device is "000", it indicates that the sending of the first reference signal and the reporting of the measurement result are not triggered; or if the value of the first request field is "001", it indicates that the network device is to send the first reference signal on the 1$^{st}$ first reference signal resource or the 1$^{st}$ group of first reference signal resources in the 1$^{st}$ first reference signal resource set and the terminal needs to report the measurement result of the first reference signal sent on the 1$^{st}$ first reference signal resource or the 1$^{st}$ group of first reference signal resources in the 1$^{st}$ first reference signal resource set.

It should be understood that the tables described above are merely examples, and this application is not intended to specially limit bits occupied by the first request field and correspondences between values of the first request field and resources of the first reference signal.

S220. The network device sends the DCI to the terminal.

S230. The terminal receives the DCI, and may measure a first reference signal based on information in a first request field in the DCI and determine whether a measurement result needs to be reported.

When it is determined that the measurement result needs to be reported, optionally, the method may further include:

S240. The terminal sends a measurement report to the network device.

For example, the terminal may send the measurement report to the network device by using a Physical Uplink Shared Channel (PUSCH).

Optionally, transmit power of the PUSCH may be determined based on a path loss from the terminal to the network device.

The path loss is equal to a difference between transmit power of the first reference signal and receive power of the first reference signal, and the receive power of the first reference signal is known to the terminal. Therefore, the path loss can be determined, provided that transmit power of the first reference signal is determined.

In a possible design, the terminal may determine the transmit power of the first reference signal based on power information sent by the network device. In this way, the terminal may determine the path loss and may further determine the transmit power of the PUSCH.

Optionally, the network device may notify the terminal of the power information by using a broadcast channel, system information, or higher layer signaling.

Further, the power information may indicate a power ratio of the first reference signal to a second reference signal.

For example, the second reference signal may be an SSS. In this case, the first reference signal may be a CSI-RS. That is, the terminal may determine a power ratio of the CSI-RS to the SSS based on the power information, and may further determine transmit power of the CSI-RS. Herein, the network device notifies the terminal of power of the SSS by using at least one of higher layer signaling, layer 2 signaling, and layer 1 signaling. The higher layer signaling herein may include either the broadcast channel or the system information.

It should be understood that power control of a physical uplink control channel (PUCCH), a sounding reference signal (SRS), a physical random access channel (PRACH), or the like is performed based on large-scale fading compensation. Therefore, transmit power of the PUCCH, PRACH, or the like may also be determined based on a path loss. For a method for determining the path loss, refer to the method for determining the path loss of the PUSCH.

In this application, optionally, the transmit power $P_{PUSCH,c}(i)$ of the PUSCH may be determined by using the following formula:

$$P_{PUSCH,c}(i) = \min \begin{Bmatrix} P_{CMAX,c}(i), \\ 10\log_{10}(M_{PUSCH,c}(i)) + P_{o\_PUSCH,c}(j) + \alpha_c(j) \cdot PL_c + \Delta_{TF,c}(i) + f_c(i) \end{Bmatrix}$$

Herein, $P_{CMAX,c}(i)$ is total transmit power of the terminal on a primary serving cell carrier c.

$M_{PUSCH,c}(i)$ is a quantity of PUSCH scheduling resource blocks in a unit of a physical resource block (PRB).

$P_{O\_PUSCH,c}(j)$ includes $P_{O\_NOMINAL\_PUSCH,c}(j)$ and $P_{O\_UE\_PUSCH,c}(j)$. $P_{O\_UE\_PUSCH,c}(j)$ is used to represent target receive power of the terminal, and is semi-statically configured by using higher layer RRC signaling. $P_{O\_NOMINAL\_PUSCH,c}(j)$ is a cell-specific parameter, and is semi-statically configured by using RRC signaling.

$\alpha_c(j)$ is a path loss compensation factor and a cell-specific parameter, and is also semi-statically configured by using higher layer RRC signaling.

$\Delta_{TF,c}(i) = 10 \log_{10}((2^{BPRE \cdot K_s} - 1) \cdot \beta_{offset}^{PUSCH})$ is a power adjustment value for different modulation and coding schemes. It is a cell-specific parameter, and is semi-statically configured by using higher layer RRC signaling.

$f_c(i)$ is a closed-loop power adjustment value, and is a feedback value quantized by a receive end based on a receiving/measurement error.

$PL_c$ is a path loss determined by the terminal.

It should be understood that the foregoing formula is merely a possible implementation of determining the transmit power of the PUSCH, and the formula for determining the transmit power of the PUSCH is not limited in this application.

In this embodiment of this application, the terminal may determine the transmit power of the first reference signal based on the power information, so that the terminal may control uplink power based on the transmit power of the first reference signal, thereby improving accuracy of a channel measurement result.

Optionally, in an embodiment of this application, the sending of the first reference signal and the reporting of the measurement result satisfy the following condition.

$Y=X+Z$, wherein X represents a delay between triggering of the sending of the first reference signal and completion of the sending of the first reference signal, Y represents a delay between triggering of the reporting of the measurement result and completion of the reporting of the measurement result, Z is a predefined value, X, Y, and Z each are greater than or equal to 0, and X is configurable. Optionally, X may alternatively be a predefined value, and Z is configurable.

The network device may determine, based on the foregoing formula, whether a measurement report currently sent by the terminal is a measurement report for a first reference signal that is last sent by the network device. In this way, the network device may send data by using a latest measurement result, thereby improving transmission performance.

Figure 3:
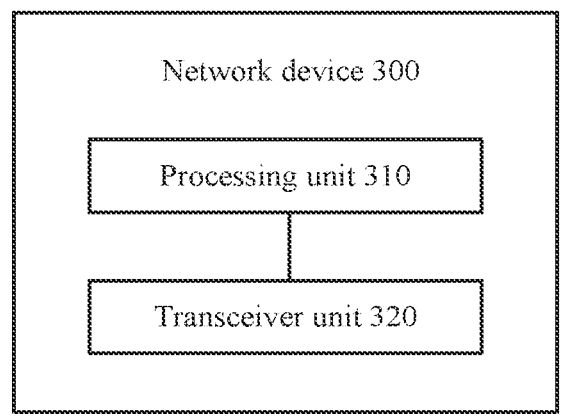
FIG. 3 is a schematic block diagram of a network device according to this application.

FIG. 3 is a schematic block diagram of a network device 300 according to an embodiment of this application. As shown in FIG. 3, the network device 300 includes a processing unit 310 and a transceiver unit 320.

The processing unit 310 is configured to determine downlink control information DCI, wherein the DCI includes a first request field, information in the first request field is only used to instruct to send a first reference signal on a first resource, or the information in the first request field is used to instruct to send the first reference signal on the first resource and instruct a terminal to report a measurement result of the first reference signal on the first resource, and the measurement result includes channel state information CSI and/or beam state information BSI.

The transceiver unit 320 is configured to send the DCI to the terminal.

It should be understood that the units in the network device 300 are respectively configured to perform actions or processing processes performed by the network device in the foregoing methods, and therefore the beneficial effects of the method embodiments can also be achieved. To avoid repeated description, detailed description is omitted herein.

Figure 4:
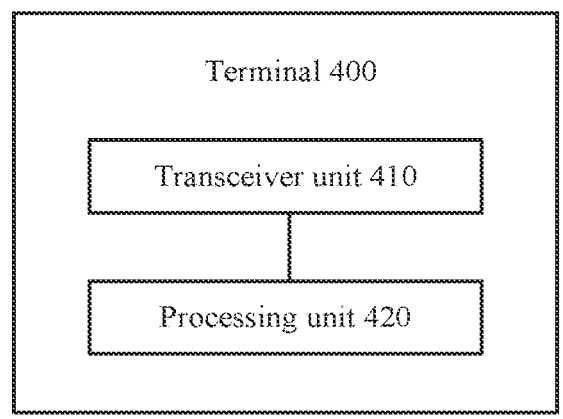
FIG. 4 is a schematic block diagram of a terminal according to this application.

FIG. 4 is a schematic block diagram of a terminal 400 according to an embodiment of this application. As shown in FIG. 4, the terminal 400 includes a transceiver unit 410 and a processing unit 420.

The transceiver unit 410 is configured to receive downlink control information DCI sent by a network device, wherein the DCI includes a first request field, information in the first request field is only used to instruct to send a first reference signal on a first resource, or the information in the first request field is used to instruct to send the first reference signal on the first resource and instruct the terminal to report a measurement result of the first reference signal on the first resource, and the measurement result includes channel state information CSI and/or beam state information BSI.

The processing unit 420 is configured to determine, based on the DCI, whether to report the measurement result.

It should be understood that the units in the terminal 400 are respectively configured to perform actions or processing processes performed by the terminal in the foregoing methods, and therefore can also achieve the beneficial effects of the method embodiments. To avoid repeated description, detailed description is omitted herein.

Figure 5:
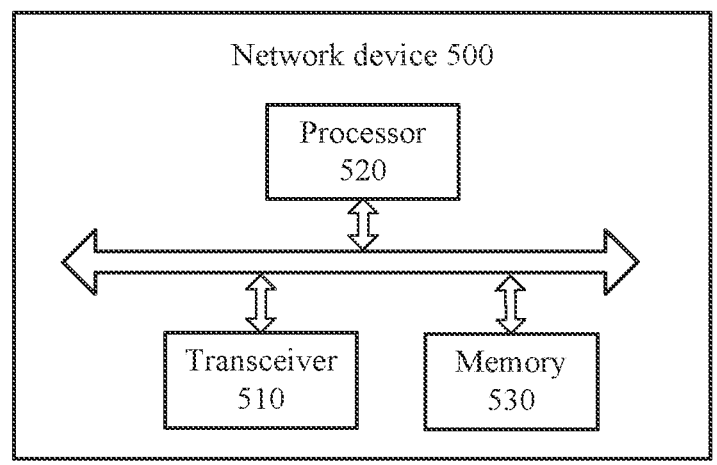
FIG. 5 is a schematic block diagram of another network device according to this application.

FIG. 5 is a schematic structural diagram of a network device 500 according to an embodiment of this application. As shown in FIG. 5, the network device 500 includes a transceiver 510, a processor 520, and a memory 530. The transceiver 510, the processor 520, and the memory 530 communicate with each other and transfer control and/or digital signals by using an internal connection channel.

The processor 520 is configured to determine downlink control information DCI, wherein the DCI includes a first request field, information in the first request field is only used to instruct to send a first reference signal on a first resource, or the information in the first request field is used to instruct to send the first reference signal on the first resource and instruct a terminal to report a measurement result of the first reference signal on the first resource, and the measurement result includes channel state information CSI and/or beam state information BSI.

The transceiver 510 is configured to send the DCI to the terminal.

It should be understood that when the processor 520 invokes a computer program from the memory and executes the computer program, the processor 520 may be configured to: perform a data processing function of the network device in the foregoing method embodiments, and control the transceiver 510 to complete corresponding information sending and receiving functions of the network device.

Figure 6:
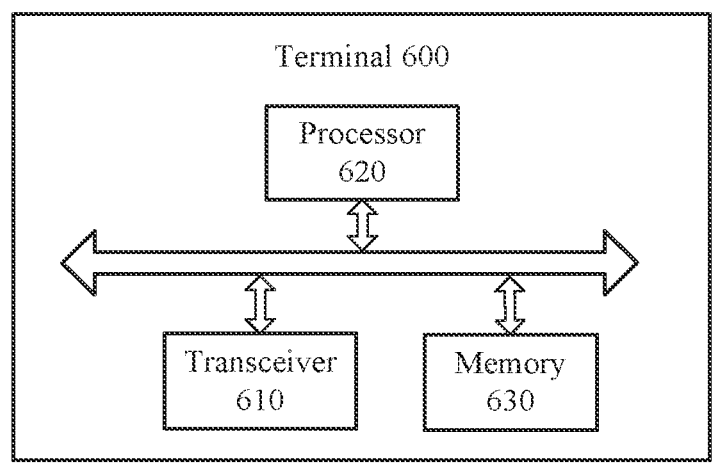
FIG. 6 is a schematic block diagram of another terminal according to this application.

FIG. 6 is a schematic structural diagram of a terminal 600 according to an embodiment of this application. As shown in FIG. 6, the terminal 600 includes a transceiver 610, a processor 620, and a memory 630. The transceiver 610, the processor 620, and the memory 630 communicate with each other and transfer control and/or digital signals by using an internal connection channel.

The transceiver 610 is configured to receive downlink control information DCI sent by a network device, wherein the DCI includes a first request field, information in the first request field is only used to instruct to send a first reference signal on a first resource, or the information in the first request field is used to instruct to send the first reference signal on the first resource and instruct the terminal to report a measurement result of the first reference signal on the first resource, and the measurement result includes channel state information CSI and/or beam state information BSI.

The processor 620 is configured to determine, based on the DCI, whether to report the measurement result.

It should be understood that when the processor 620 invokes the computer program from the memory and executes the computer program, the processor 620 may be configured to: perform a data processing function of the terminal in the foregoing method embodiments, and control the transceiver 610 to complete corresponding information sending and receiving functions of the terminal.

The embodiments of this application may be applied to a processor, or may be implemented by a processor. The processor may be an integrated circuit chip and has a signal processing capability. In an implementation process, steps in the foregoing method embodiments may be implemented by using a hardware integrated logical circuit in the processor, or by using instructions in a form of software. The processor may be a central processing unit (CPU). Alternatively, the processor may be another general purpose processor, digital signal processor (DSP), application-specific integrated circuit (ASIC), field programmable gate array (FPGA), another programmable logic device, discrete gate or transistor logic device, or a discrete hardware component. The processor can implement or perform the methods, steps, and logical block diagrams that are disclosed in the embodiments of this application. The general purpose processor may be a microprocessor, or the processor may be any conventional processor or the like. The steps of the methods disclosed with reference to the embodiments of this application may be directly embodied as being executed by a hardware decoding processor, or executed by a combination of hardware of a decoding processor and a software component. The software component may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that when the embodiments of this application are applied to a network device chip, the network device chip implements the function of the processing unit 310 or the processor 520. The network device chip sends the DCI to another module (for example, a radio frequency module or an antenna) in the network device. The DCI is sent to the terminal by the another module in the network device. Optionally, the network device chip may further receive the measurement report from the another module (for example, the frequency module or the antenna) in the network device, and the measurement report is sent by the terminal to the network device.

When the embodiments of this application are applied to a terminal chip, the terminal chip implements the function of the processing unit 420 or the processor 620. The terminal chip receives the DCI from another module (for example, a radio frequency module or an antenna) in the terminal, and the DCI is sent by the network device to the terminal. Optionally, the terminal chip may further send the measurement report to the another module (for example, the frequency module or the antenna) in the terminal, and the measurement report is sent by the another module in the terminal to the network device.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of an example but not limitative description, many forms of RAMs, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous-link dynamic random access memory (synchlink DRAM, SLDRAM), and a direct rambus random access memory (direct rambus RAM, DRRAM), may be used. It should be noted that the memory of the systems and methods described in this specification includes but is not limited to these memories and any memory of another proper type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
   receiving downlink control information (DCI) from a network device, wherein the DCI comprises a channel state information (CSI) request field, wherein the CSI request field indicates sending reference signal from the network device to a terminal device, and the CSI request field triggers the terminal device to report a measurement result of the reference signal to the network device, wherein, according to a state value of the CSI request field and a relation between the state value and the measurement result, the measurement result comprises:
   beam state information (BSI), or
   BSI and CSI;
   receiving the reference signal; and
   reporting the measurement result to the network device based on the DCI and the reference signal;
   wherein the BSI comprises reference signal received power (RSRP) of the reference signal.

2. The transmission method according to claim 1, wherein the DCI satisfies a format that is used for uplink data transmission.

3. The transmission method according to claim 1, wherein the transmission method comprises:
   receiving a resource configuration of the reference signal, wherein the resource configuration includes information of a first resource, and wherein the first resource is a first reference signal resource set in one or more first reference signal resource sets.

4. The transmission method according to claim 1, wherein the transmission method further comprises:
receiving power information from the network device; and
determining transmit power of the reference signal based on the power information.

5. The transmission method according to claim 1, wherein the state value of the CSI request field is one of: 001, 010, 011, 100, 101, 110, or 111.

6. The transmission method according to claim 1, wherein the relation comprises relation between at least two different state values and two different measurement results, wherein one state value is associated with BSI, and wherein another state value is associated with CSI.

7. The transmission method according to claim 4, wherein the power information is used to indicate a power ratio of the reference signal to another reference signal.

8. The transmission method according to claim 7, wherein the reference signal is a channel state information reference signal (CSI-RS), and wherein the another reference signal is a secondary synchronization signal (SSS).

9. A transmission apparatus, comprising:
at least one processor; and
one or more memories coupled to the at least one processor and storing programming instructions for execution by the at least one processor to perform operations comprising:
receiving downlink control information (DCI) from a network device, wherein the DCI comprises a channel state information (CSI) request field, wherein the CSI request field indicates sending reference signal from the network device to a terminal device, and the CSI request field triggers the terminal device to report a measurement result of the reference signal to the network device, wherein, according to a state value of the CSI request field and a relation between the state value and the measurement result, the measurement result comprises:
beam state information (BSI), or
BSI and CSI;
receiving the reference signal; and
reporting the measurement result to the network device based on the DCI and the reference signal;
wherein the BSI comprises reference signal received power (RSRP) of the reference signal.

10. The transmission apparatus according to claim 9, wherein the DCI satisfies a format that is used for uplink data transmission.

11. The transmission apparatus according to claim 9, wherein the operations comprise:
receiving a resource configuration of the reference signal, wherein the resource configuration includes information of a first resource, and wherein the first resource is a first reference signal resource set in one or more first reference signal resource sets.

12. The transmission apparatus according to claim 9, wherein the operations further comprise:
receiving power information from the network device; and
determining transmit power of the reference signal based on the power information.

13. The transmission apparatus according to claim 9, wherein the state value of the CSI request field is one of: 001, 010, 011, 100, 101, 110 or 111.

14. The transmission apparatus according to claim 9, wherein the relation comprises relation between at least two different state values and two different measurement results, wherein one state value is associated with BSI, and wherein another state value is associated with CSI.

15. The transmission apparatus according to claim 12, wherein the power information is used to indicate a power ratio of the reference signal to another reference signal.

16. The transmission apparatus according to claim 15, wherein the reference signal is a channel state information reference signal (CSI-RS), and wherein the another reference signal is a secondary synchronization signal (SSS).

17. A transmission method, comprising:
transmitting downlink control information (DCI) to a terminal device, wherein the DCI comprises a channel state information (CSI) request field, wherein the CSI request field indicates sending reference signal from a network device to the terminal device, and the CSI request field triggers the terminal device to report a measurement result of the reference signal to the network device, wherein, according to a state value of the CSI request field and a relation between the state value and the measurement result, the measurement result comprises:
beam state information (BSI), or
BSI and CSI;
transmitting the reference signal; and
receiving the measurement result from the terminal device;
wherein the BSI comprises reference signal received power (RSRP) of the reference signal.

18. The transmission method according to claim 17, wherein the DCI satisfies a format that is used for uplink data transmission.

19. The transmission method according to claim 17, wherein the transmission method comprises:
transmitting a resource configuration of the reference signal, wherein the resource configuration includes information of a first resource, and wherein the first resource is a first reference signal resource set in one or more first reference signal resource sets.

20. The transmission method according to claim 17, wherein the transmission method further comprises:
transmitting power information to the terminal device.

21. The transmission method according to claim 17, wherein the state value of the CSI request field is one of: 001, 010, 011, 100, 101, 110 or 111.

22. The transmission method according to claim 17, wherein the relation comprises relation between at least two different state values and two different measurement results, wherein one state value is associated with BSI, and wherein another state value is associated with CSI.

23. The transmission method according to claim 20, wherein the power information is used to indicate a power ratio of the reference signal to another reference signal.

24. The transmission method according to claim 23, wherein the reference signal is a channel state information reference signal (CSI-RS), and wherein the another reference signal is a secondary synchronization signal (SSS).

25. A transmission apparatus, comprising:
at least one processor; and
one or more memories coupled to the at least one processor and storing programming instructions for execution by the at least one processor to perform operations comprising:
transmitting downlink control information (DCI) to a terminal device, wherein the DCI comprises a channel state information (CSI) request field, wherein the CSI request field indicates sending reference signal from a network device to the terminal device, and the CSI request field triggers the terminal device to report a measurement result of the reference signal to the network device, wherein, according to a state value of the CSI request field and a relation between the state value and the measurement result, the measurement result comprises:
  beam state information (BSI), or
  BSI and CSI;
transmitting the reference signal; and
receiving the measurement result from the terminal device;
wherein the BSI comprises reference signal received power (RSRP) of the reference signal.

26. The transmission apparatus according to claim 25, wherein the DCI satisfies a format that is used for uplink data transmission.

27. The transmission apparatus according to claim 25, wherein the operations comprise:
  transmitting a resource configuration of the reference signal, wherein the resource configuration includes information of a first resource, and wherein the first resource is a first reference signal resource set in one or more first reference signal resource sets.

28. The transmission apparatus according to claim 25, wherein the operations further comprise:
  transmitting power information to the terminal device.

29. The transmission apparatus according to claim 25, wherein the state value of the CSI request field is one of: 001, 010, 011, 100, 101, 110 or 111.

30. The transmission apparatus according to claim 25, wherein the relation comprises relation between at least two different state values and two different measurement results, wherein one state value is associated with BSI, and wherein another state value is associated with CSI.

31. The transmission apparatus according to claim 28, wherein the power information is used to indicate a power ratio of the reference signal to another reference signal.

32. The transmission apparatus according to claim 31, wherein the reference signal is a channel state information reference signal (CSI-RS), and wherein the another reference signal is a secondary synchronization signal (SSS).

33. A non-transitory computer readable storage medium, the non-transitory computer readable storage medium comprising programming instructions for execution by at least one processor to implement operations comprising:
  receiving downlink control information (DCI) from a network device, wherein the DCI comprises a channel state information (CSI) request field, wherein the CSI request field indicates sending reference signal from the network device to a terminal device, and the CSI request field triggers the terminal device to report a measurement result of the reference signal to the network device, wherein, according to a state value of the CSI request field and a relation between the state value and the measurement result, the measurement result comprises:
    beam state information (BSI), or
    BSI and CSI;
  receiving the reference signal; and
  reporting the measurement result to the network device based on the DCI and the reference signal;
  wherein the BSI comprises reference signal received power (RSRP) of the reference signal.

34. The non-transitory computer readable storage medium according to claim 33, wherein the DCI satisfies a format that is used for uplink data transmission.

35. The non-transitory computer readable storage medium according to claim 33, wherein the operations comprise:
  receiving a resource configuration of the reference signal, wherein the resource configuration includes information of a first resource, and wherein the first resource is a first reference signal resource set in one or more first reference signal resource sets.

36. The non-transitory computer readable storage medium according to claim 33, wherein the relation comprises relation between at least two different state values and two different measurement results, wherein one state value is associated with BSI, and wherein another state value is associated with CSI.

37. A non-transitory computer readable storage medium, the non-transitory computer readable storage medium comprising programming instructions for execution by at least one processor to perform operations comprising:
  transmitting downlink control information (DCI) to a terminal device, wherein the DCI comprises a channel state information (CSI) request field, wherein the CSI request field indicates sending reference signal from a network device to the terminal device, and the CSI request field triggers the terminal device to report a measurement result of the reference signal to the network device, wherein, according to a state value of the CSI request field and a relation between the state value and the measurement result, the measurement result comprises:
    beam state information (BSI), or
    BSI and CSI;
  transmitting the reference signal; and
  receiving the measurement result from the terminal device;
  wherein the BSI comprises reference signal received power (RSRP) of the reference signal.

38. The non-transitory computer readable storage medium according to claim 37, wherein the DCI satisfies a format that is used for uplink data transmission.

39. The non-transitory computer readable storage medium according to claim 37, wherein the operations comprise:
  transmitting a resource configuration of the reference signal, wherein the resource configuration includes information of a first resource, and wherein the first resource is a first reference signal resource set in one or more first reference signal resource sets.

40. The non-transitory computer readable storage medium according to claim 37, wherein the relation comprises relation between at least two different state values and two different measurement results, wherein one state value is associated with BSI, and wherein another state value is associated with CSI.

* * * * *